United States Patent
Lee et al.

(10) Patent No.: US 11,976,877 B2
(45) Date of Patent: May 7, 2024

(54) METHOD FOR CONTROLLING WATER PURIFIER

(71) Applicant: LG Electronics Inc., Seoul (KR)

(72) Inventors: Sangjoon Lee, Seoul (KR); Yongbum Kim, Seoul (KR); Jongwoo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 1260 days.

(21) Appl. No.: 16/473,732

(22) PCT Filed: Dec. 22, 2017

(86) PCT No.: PCT/KR2017/015396
§ 371 (c)(1),
(2) Date: Jun. 26, 2019

(87) PCT Pub. No.: WO2018/124667
PCT Pub. Date: Jul. 5, 2018

(65) Prior Publication Data
US 2021/0131724 A1     May 6, 2021

(30) Foreign Application Priority Data
Dec. 26, 2016    (KR) ........................ 10-2016-0179096

(51) Int. Cl.
| | |
|---|---|
| F25D 31/00 | (2006.01) |
| B01F 27/05 | (2022.01) |
| B01F 35/21 | (2022.01) |
| B01F 35/22 | (2022.01) |
| B67D 1/00 | (2006.01) |
| B67D 1/08 | (2006.01) |
| C02F 1/00 | (2023.01) |

(52) U.S. Cl.
CPC ............ *F25D 31/003* (2013.01); *B01F 27/05* (2022.01); *B01F 35/2115* (2022.01);
(Continued)

(58) Field of Classification Search
CPC .......... F25D 31/003; F25D 3/02; F25D 29/00; F25D 31/00; F25D 31/002; F25D 3/10;
(Continued)

(56) References Cited

U.S. PATENT DOCUMENTS 3,988,902 A * 11/1976 Jacobs ..................... A23G 9/12
                                                          62/342
5,259,201 A * 11/1993 Sakai ....................... F25C 1/12
                                                          62/135

(Continued)

FOREIGN PATENT DOCUMENTS

| | | |
|---|---|---|
| CN | 201316162 | 9/2009 |
| CN | 102435032 | 5/2012 |

(Continued)

OTHER PUBLICATIONS

English Translation of Jeong et al patent publication KR20160023282A, published Mar. 2016. (Year: 2016).*

(Continued)

*Primary Examiner* — Joseph W Drodge
(74) *Attorney, Agent, or Firm* — Fish & Richardson P.C.

(57) ABSTRACT

According to an embodiment of the present invention, a method for controlling a water purifier delays the operating time of an agitator at an early stage of a current refrigerating cycle operation when a supercooled state has occurred in an immediately previous refrigerating cycle operation step.

13 Claims, 8 Drawing Sheets

(52) U.S. Cl.
CPC ........ B01F 35/2202 (2022.01); B67D 1/0014 (2013.01); B67D 1/0859 (2013.01); C02F 1/003 (2013.01); C02F 2209/02 (2013.01); C02F 2307/10 (2013.01)

(58) Field of Classification Search
CPC . F25D 3/102; F25D 9/00; F25D 13/00; F25D 17/00; F25D 17/02; F25D 17/06; F25D 31/006; F25D 21/14; B01F 27/05; B01F 35/2115; B01F 35/2202; B01F 27/00; B01F 27/90; B67D 1/0014; B67D 1/0859; B67D 2210/0001; B67D 2210/00031; B67D 2210/00041; B67D 1/0006; B67D 1/0085; B67D 1/0884; B67D 1/0888; B67D 1/0857; B67D 1/0858; B67D 3/0009; B67D 3/0012; B67D 7/76; B67D 7/766; B67D 7/78; B67D 7/80; B67D 2210/0006; B67D 2210/0085; B67D 2210/0884; B67D 2210/0888; B67D 2210/00099; B67D 2210/00104; B67D 2210/00118; C02F 1/003; C02F 2209/02; C02F 2307/10; C02F 1/283; C02F 1/444; C02F 1/44; C02F 1/441; G05D 23/19; G05D 23/1902; F25B 1/00; F25B 9/002; F25B 19/00; F25B 19/005; F25B 43/00; F25B 43/003; F25B 49/02; F25B 49/022; F25C 1/12; F25C 2600/00; F25C 2600/02; F25C 2700/14

See application file for complete search history.

(56) References Cited

U.S. PATENT DOCUMENTS

| | | | | |
|---|---|---|---|---|
| 6,257,009 B1* | 7/2001 | Tsuchikawa | ............ | F25C 1/147 62/233 |
| 6,449,966 B1* | 9/2002 | Bethuy | ............ | F25D 31/003 324/706 |
| 2005/0235665 A1* | 10/2005 | Kim | ............ | F25C 1/04 62/340 |
| 2007/0089451 A1* | 4/2007 | Lee | ............ | F25C 1/12 62/352 |
| 2013/0167563 A1* | 7/2013 | Lee | ............ | F25D 23/02 62/340 |
| 2014/0223942 A1* | 8/2014 | Lee | ............ | F25D 31/003 62/190 |
| 2015/0237766 A1 | 8/2015 | Ding et al. | | |

FOREIGN PATENT DOCUMENTS

| | | | | |
|---|---|---|---|---|
| CN | 103890526 | | 6/2014 | |
| JP | S58193070 | | 11/1983 | |
| JP | 2001133109 | | 5/2001 | |
| JP | 2003185319 | | 7/2003 | |
| JP | 2006329538 | | 12/2006 | |
| JP | 2009293852 | | 12/2009 | |
| KR | 830005544 | | 8/1983 | |
| KR | 20100078801 | | 7/2010 | |
| KR | 20100119383 | | 11/2010 | |
| KR | 10-2012-0140417 | | 12/2012 | |
| KR | 20150019118 | | 2/2015 | |
| KR | 10-2015-0101163 | | 9/2015 | |
| KR | 10-2015-0101163 A | † | 9/2015 | |
| KR | 20160023282 A | * | 3/2016 | ................ F25C 5/22 |

OTHER PUBLICATIONS

Chinese Office Action in Chinese Application No. 201780072740.8, dated Jun. 28, 2020, 14 pages (with English translation).
Extended European Search Report in European Application No. 17889172.7, dated Jul. 20, 2020, 8 pages.
Office Action in Korean Appln. No. 10-2016-0179096, dated Apr. 20, 2023, 12 pages (with English machine translation).

\* cited by examiner
† cited by third party

METHOD FOR CONTROLLING WATER PURIFIER

CROSS-REFERENCE TO RELATED APPLICATIONS

This application is a National Stage application under 35 U.S.C. § of International Application No. PCT/KR2017/015396, filed on Dec. 22, 2017, which claims the benefit of Korean Application No. 10-2016-0179096, filed on Dec. 26, 2016. The disclosures of the prior applications are incorporated by reference in their entirety.

TECHNICAL FIELD

The present invention relates to a method for controlling a water purifier.

BACKGROUND ART

A water purifier is a device that filters harmful elements such as foreign substances or heavy metals contained in water by physical and/or chemical methods.

Prior Art 1 filed and published by the applicant of the present invention discloses a structure of a water purifier.

The conventional water purifier disclosed in the prior art, that is, the direct-type water purifier, has a structure in which a cold water pipe and an evaporator for cooling cooling water are immersed in the cooling water. Prior Art 1 can be defined as a so-called ice-storage cooling direct type water purifier.

In detail, when a refrigerant flows into the evaporator so as to generate cold water, a part of the cooling water is frozen around the evaporator to generate ice. An agitator is operated to promote heat exchange between the cooling water and the cold water flowing through the cold water pipe immersed in the cooling water. When the agitator is operated, the temperature of the cooling water is uniformly maintained over the entire region inside the container in which the cooling water is stored.

In addition, heat is transferred from the cold water flowing along the cold water pipe to the cooling water, and the temperature of the normal-temperature water flowing along the cold water pipe is lowered to the temperature of the cold water. The cooling water, which has absorbed the heat discharged from the cold water pipe, exchanges heat with the cooling water that is frozen around the evaporator and kept in the ice state.

As described above, the ice-storage cooling direct type water purifier has an advantage that the energy loss is remarkably smaller than that of the conventional water-storage type water purifier.

However, in the case of the ice-storage cooling direct type water purifier, there is a situation in which, for a specific reason, the cooling water does not freeze even below a freezing temperature, that is, 0° C., the cooling water remains in a liquid state of a sub-zero temperature state. This situation is defined as a supercooling phenomenon or a supercooled state.

When such a supercooled state occurs, the ice-storage energy of the ice cannot be used, resulting in a deterioration in the cold water outflow performance.

In addition, when the ice-storage control is normally performed, the operation cycle of the refrigerating cycle including a compressor becomes long. Therefore, the power consumption reduction effect can be obtained by reducing the operation rate of the refrigerating cycle. However, when the supercooling phenomenon occurs, there is a disadvantage that such an operation rate reduction effect cannot be obtained.

In order to prevent the possibility of occurrence of such a supercooling, a method for generating an ultrasonic wave to prevent supercooling of a cooling material has been proposed. This is disclosed in Prior Art 2.

Prior Art 1: Korean Patent Application Publication No. 10-2015-0019118 (Feb. 25, 2015)

Prior Art 2: Korean Patent Application Publication No. 10-2010-0119383 (Nov. 9, 2010)

DISCLOSURE OF THE INVENTION

Technical Problem

However, in the case of the supercooling prevention method disclosed in Prior Art 2, the following problem still occurs.

That is, in order to prevent the occurrence of the supercooling, an impact device such as an ultrasonic wave generator is additionally provided to artificially make a state of stabilized cooling water into an unstable state, thereby generating icing nuclei. Therefore, since an additional vibration device and an additional control device for preventing supercooling must be provided, the manufacturing cost of the water purifier is increased.

Here, the term "stabilized state" does not mean a quiet state in which no impact is applied, but means a state in which the same state as the previous state is maintained. In other words, destroying the stabilized state means giving a change of environment such that a state different from a previous state occurs. As an example of such a method, there is a method of destroying the stabilized state by changing the state to a state different from the previous state by applying an impact such as ultrasonic waves to the stabilized state which is kept in a quiet state.

Conversely, stopping the supply of ultrasonic waves in the state of continuously applying ultrasonic waves can also be regarded as an example of destroying the stabilized state.

In addition, since the ultrasonic device must be always operated, energy efficiency of the water purifier is deteriorated.

A method for controlling a water purifier according to an embodiment of the present invention is proposed to solve the above-described problems.

Technical Solution

In order to achieve the above-described object, there is provided a control method of a water purifier, the water purifier including: a cooling water tank storing cooling water; a cold water pipe through which edible water flows thereinside, which is received in the cooling water tank, and allowing the edible water to exchange heat with the cooling water such that the edible water is cooled to a temperature lower than room temperature; a refrigerating cycle including an evaporator which is accommodated in the cooling water tank and through which a low-temperature low-pressure two-phase refrigerant for cooling the cooling water flows, and a compressor compressing the low-temperature low-pressure refrigerant introduced from the evaporator into high-temperature high-pressure gaseous refrigerant; and an agitator accommodated in the cooling water tank to forcibly flow the cooling water such that the cooling water in a liquid state exchanges heat with the cooling water in an ice state generated on the surface of the evaporator, the control method including: operating a refrigerating cycle when a temperature (T) of the cooling water rises to an upper limit temperature (Tmax) to drive the compressor, wherein, when it is determined that a super-cooled state has occurred while an immediately previous refrigerating cycle is operated, a driving of the agitator is controlled to be delayed.

Advantageous Effects

According to the method for controlling the water purifier according to the embodiment of the present invention, a separate device for destroying a stable state of cooling water is not required besides components necessary for a refrigerating cycle for implementing a ice-storage cooling system, thereby reducing the manufacturing cost of the water purifier.

In addition, since a supercooling prevention algorithm according to the embodiment of the present invention operates only when a supercooling phenomenon occurs, the power consumption of the water purifier consumed for preventing the supercooling is reduced.

In addition, when the supercooling state occurs, the driving point of the agitator is changed when the refrigerating cycle is driven thereafter, thereby making a condition that the freezing nuclei can be easily generated. Therefore, there is an advantage that the supercooling can be prevented.

BEST MODE

Hereinafter, a control method for preventing supercooling of a water purifier according to an embodiment of the present invention will be described in detail with reference to the accompanying drawings.

Figure 1:
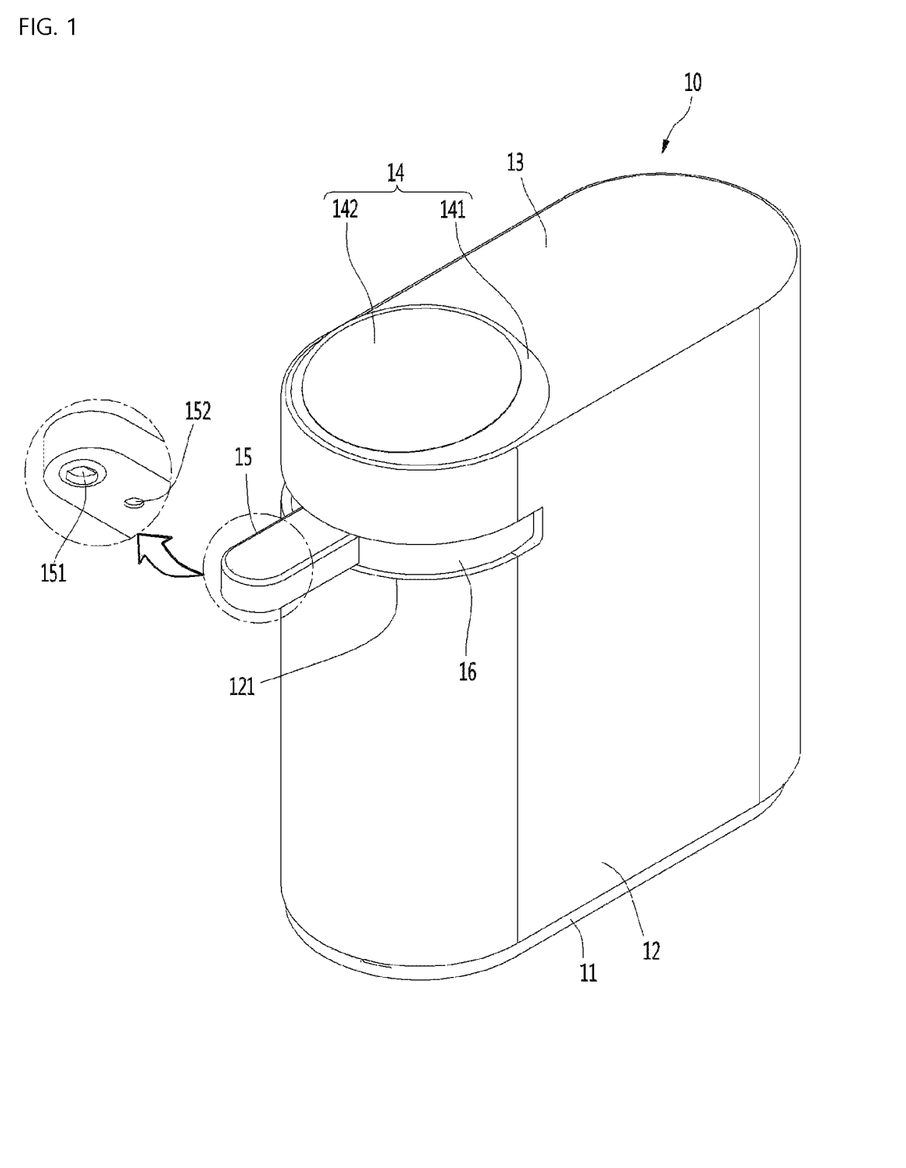
FIG. 1 is a front perspective view of a water purifier in which a control method according to an embodiment of the present invention is implemented.
Figure 2:
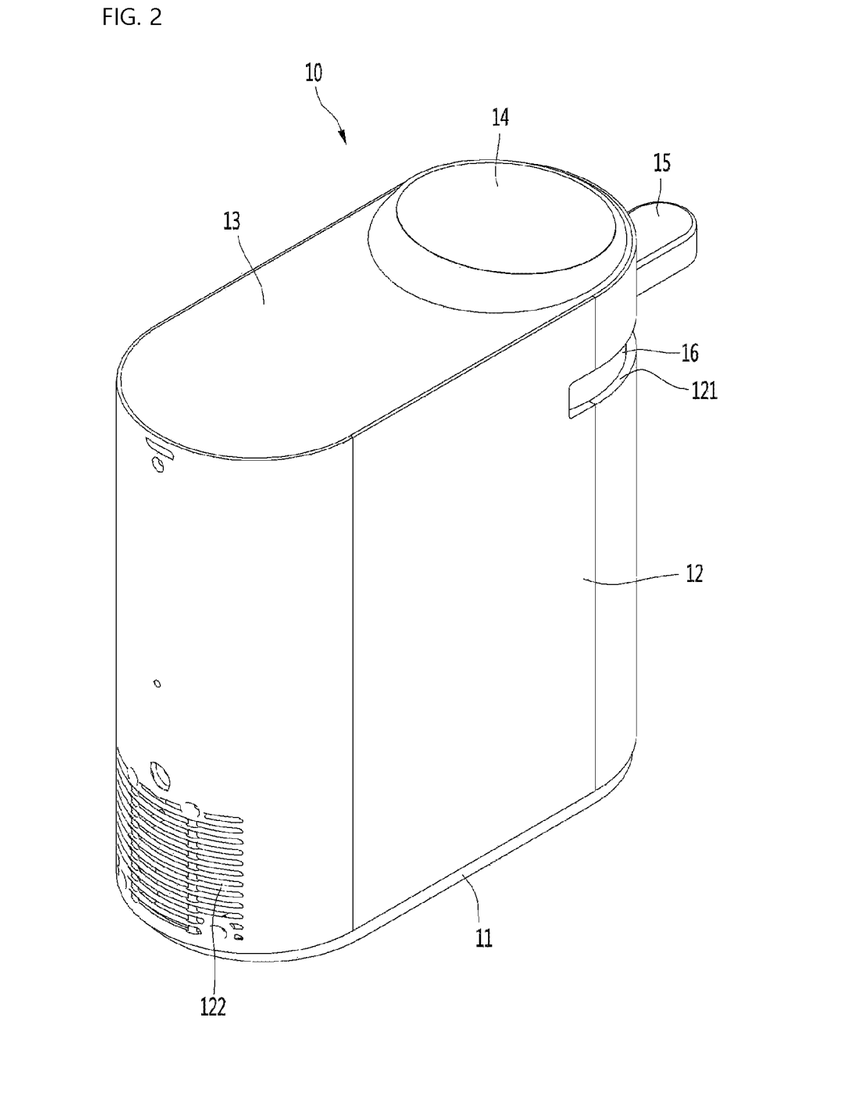
FIG. 2 is a rear perspective view of the water purifier.

FIG. 1 is a front perspective view of a water purifier in which a control method according to an embodiment of the present invention is implemented, and FIG. 2 is a rear perspective view of the water purifier.

Referring to FIGS. 1 and 2, the water purifier 10 in which the control method according to the embodiment of the present invention is applied is a direct type cold/hot water purifier for cooling or heating water supplied directly from an external water source and dispensing the water.

In detail, the water purifier 10 may include a base 11 constituting a bottom portion, a housing 12 disposed on the edge of the upper surface of the base 11, a cover 13 covering the opened upper surface of the housing 12, a control panel 14 formed on the upper surface of the cover 13, and a water chute 15 protruding from the outer circumferential surface of the housing 12.

In more detail, a portion where the water chute 15 is formed may be defined as the front surface of the water purifier 10, and an opposite surface thereof may be defined as the rear surface. A discharge grille 122 is formed at the bottom end of the rear surface of the housing 12 such that air heat-exchanged with a condenser (described later) mounted inside the housing 12 is discharged to the outside of the housing 12.

In addition, the control panel 14 may be formed at a position close to the front end of the water purifier 10 and may be formed at a position close to the center of the upper surface or the rear end of the water purifier 10 according to design conditions. The control panel 14 may be formed to be inclined in such a manner that a rear is higher than a front, such that the control panel 14 can be easily recognized by the user who is in front of the water chute 15 as it goes backward.

Figure 3:
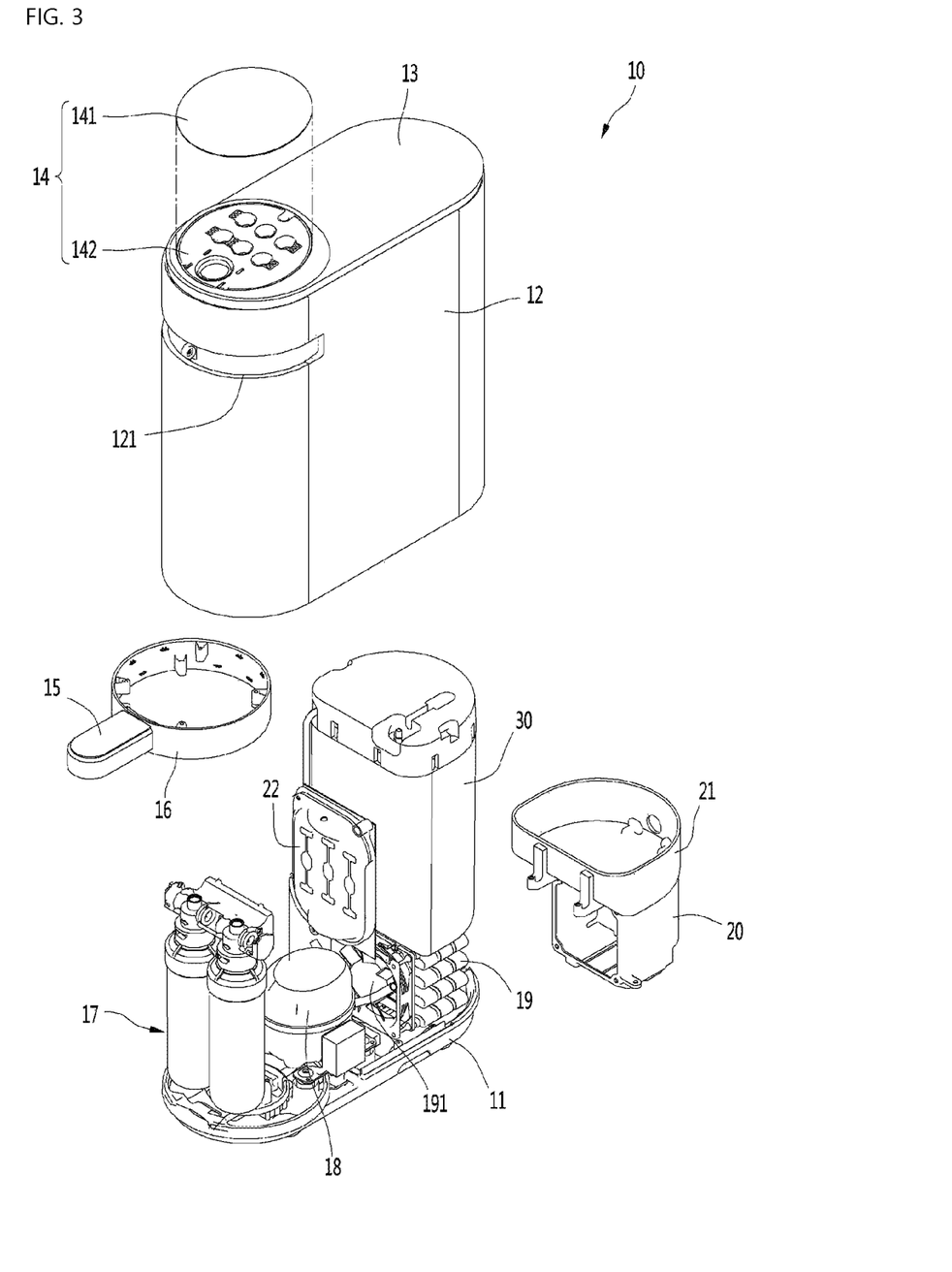
FIG. 3 is an exploded perspective view showing the internal configuration of the water purifier according to the embodiment of the present invention.

In detail, the control panel 14 may include a panel main body 141 having the rear end protruding higher than the front end from the upper surface of the water purifier 10, and a panel cover 142 covering the upper surface of the panel main body 141. As shown in FIG. 3, the panel main body 141 may have holes or grooves for mounting a plurality of button portions, and buttons may be mounted on the holes or grooves, respectively. Button menus corresponding to the button portions may be printed on the panel cover 142.

The water chute 15 may extend a predetermined length forward from the front surface of the housing 12 and may be rotatable 90 degrees from the center of the front end of the water purifier 10 to the left and right. That is, the water chute 15 can rotate 180 degrees.

In addition, a rotation guide 16 having a circular band shape may be mounted on the rear end of the water chute 15 such that the water chute 15 can rotate. The water chute 15 and the rotation guide 16 may be injection-molded into one body, or may be formed as separate parts and bonded together by a fastening member.

In addition, a guide hole 121 for guiding the rotation of the water chute 15 may be formed on the front surface of the housing 12. The water chute 15 is rotatable 90 degrees to the left and right along the guide hole 121.

In addition, a dispensing port 151 for dispensing water is formed at the bottom surface of the water chute 15. One or more dispensing ports 151 may be formed. When a single dispensing port 151 is formed, a flow path may be formed such that cold water, purified water, and hot water are discharged through one dispensing port. Meanwhile, although not shown, a plurality of dispensing ports 151 may be arranged in a line in the front-rear direction such that cold water, purified water, and hot water are dispensed to separate dispensing ports.

In addition, a sensor 152 may be mounted on the bottom surface of the water chute 15 such that water can be dispensed when the user places a storage container such as a cup below the water chute 15. Therefore, after a water dispensing command is input through the control panel 14, water can be prevented from being dispensed from the dispensing port 151 before the cup is placed below the water chute 15.

FIG. 3 is an exploded perspective view showing the internal configuration of the water purifier according to the embodiment of the present invention.

Referring to FIG. 3, a refrigerating cycle for cooling water and a plurality of elements including a cold water generation unit 30 for generating cold water are accommodated inside the housing 12 forming the appearance of the water purifier 10 according to the embodiment of the present invention. It can be understood that the arrangement positions or shapes of a plurality of components described below are not limited to the illustrated drawings.

In detail, the water purifier 10 may include a compressor 18 disposed on one side of the upper surface of the base 11 to compress the refrigerant into a high-temperature high-pressure gaseous refrigerant, a condenser 19 disposed on the rear side of the base 11 to condense the refrigerant discharged from the compressor 18 into a high-temperature high-pressure liquid refrigerant, and a condensing fan 191 suctioning air of the room where the water purifier 10 is placed and performing heat exchange with the condenser 19.

In addition, the water purifier 10 may further include a filter assembly 17 filtering foreign substances contained in water supplied from the water supply source. The filter assembly 17 may be positioned on the front end side of the base 11. The filter assembly 17 may include one or both of a pre-carbon filter and an ultra filtration filter.

In addition, the water purifier 10 may further include an expansion valve (not shown) expanding the refrigerant discharged from the condenser 19 into a low-temperature low-pressure two-phase refrigerant, and an evaporator (not shown) through which the low-temperature low-pressure two-phase refrigerant having passed through the expansion value flows.

In detail, the water purifier 10 may further include a cold water generating unit 30 accommodating the evaporator and a cold water pipe (described later) through which cold water flows, and the cold water generating unit 30 may be disposed above the condenser 19, but is not limited thereto.

In addition, the water purifier 10 may further include a guide duct 20 surrounding the condenser, and a tank support portion 21 supporting the bottom surface of the cold water generating unit 30. The tank support portion 21 and the guide duct 20 may be plastic-injection-molded as one body, or may be provided as separate articles and bonded together by a fastening member.

In addition, the water purifier 10 may further include a hot water heater 22 heating the water to be supplied to a set temperature.

Figure 4:
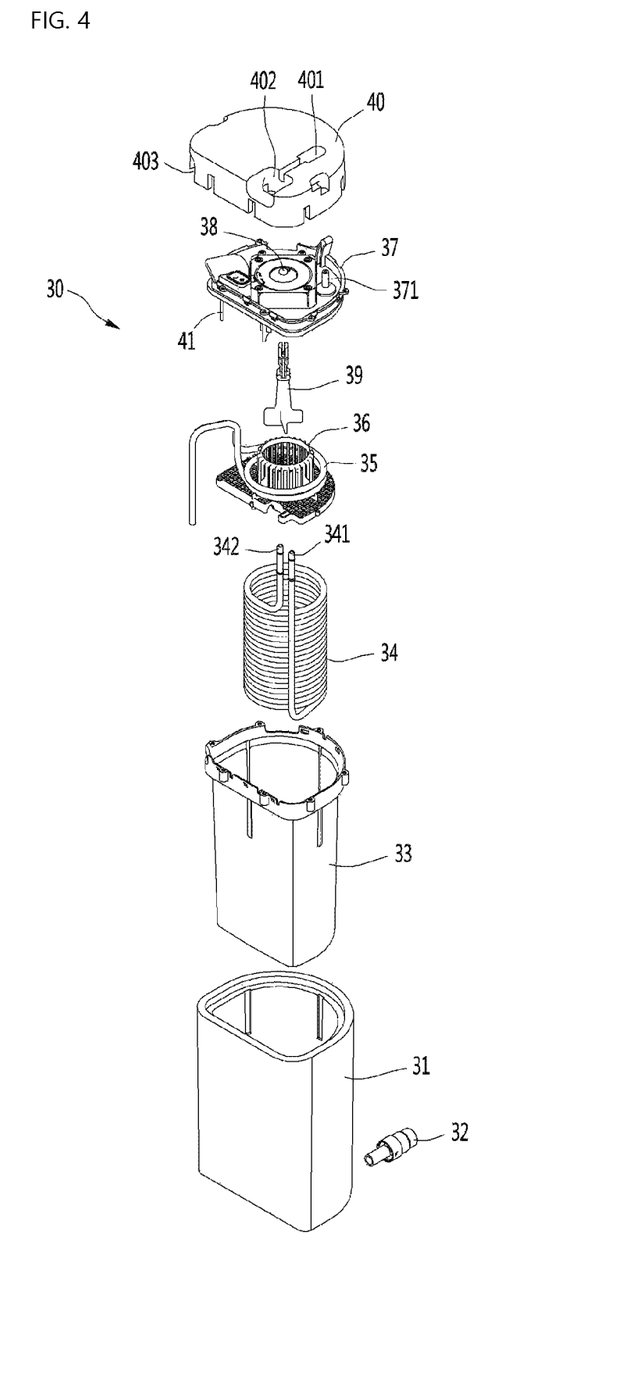
FIG. 4 is an external perspective view of a cold water generating unit according to an embodiment of the present invention.
Figure 5:
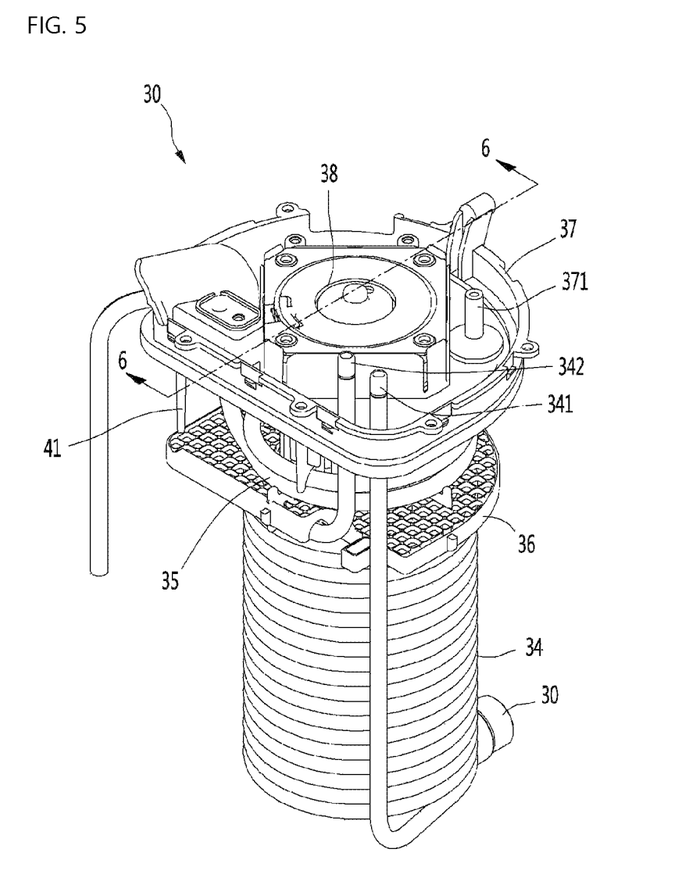
FIG. 5 is an assembled perspective view of the cold water generating unit in a state in which a case is removed.
Figure 6:
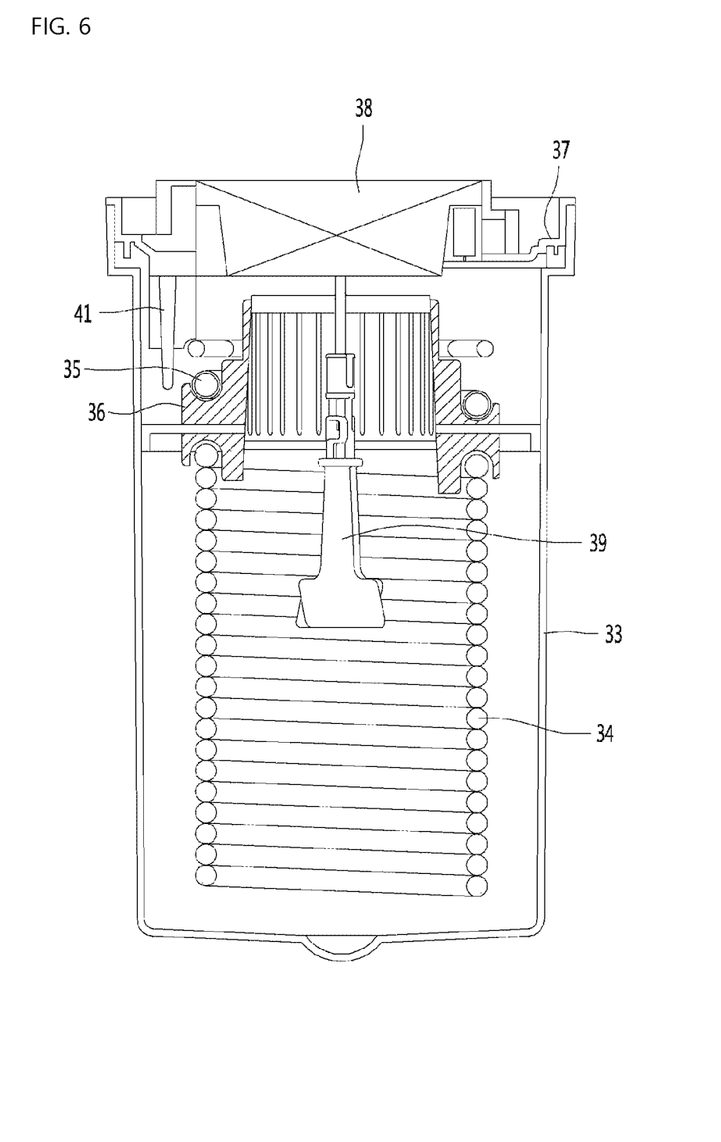
FIG. 6 is a longitudinal sectional view taken along line 6-6 of FIG. 5.

FIG. 4 is an external perspective view of the cold water generating unit according to an embodiment of the present invention, FIG. 5 is an assembled perspective view of the cold water generating unit in a state in which a case is removed, and FIG. 6 is a longitudinal sectional view taken along line 6-6 of FIG. 5.

Referring to FIGS. 4 to 6, the cold water generating unit 30 according to the embodiment of the present invention may include a cooling water tank 33 filled with cooling water, an insulation case 31 surrounding the cooling water tank 33 so as to be insulated from indoor air, a drain valve 32 passing through the insulation case 31 and communicating with the inner space of the cooling water tank 33, a cold water pipe 34 accommodated in the cooling water tank 33, a partition member 36 accommodated in the cooling water tank 33 in a state of being placed on the upper side of the cold water pipe 34, an evaporator 35 seated on the partition member 36, a tank cover 37 covering the upper end of the cooling water tank 33, an agitator motor 38 fixed to the inside of the tank cover 37 and having a rotational shaft extending downward, an agitator 39 accommodated in the cooling water tank 33 and connected to the rotational shaft of the agitator motor 38, and a case cover 40 covering the opened upper surface of the insulation case 31.

In detail, the drain valve 32 is installed to pass through the insulation case 31 and the cooling water tank 33, and is inserted through the side surface of the insulation case 31 corresponding to a position adjacent to the bottom portion of the cooling water tank 33. When the drain valve 32 is opened, the cooling water stored in the cooling water tank 33 is discharged to the outside of the water purifier 10.

In addition, the insulation case 31 may be made of a heat insulating material such as Styrofoam, and the insulation case 31 may be seated on the tank support portion 21.

In addition, the cold water pipe 34 may be formed into a cylindrical shape by being wound in a spiral shape as shown, and pipes vertically adjacent to each other may be formed to be in contact with each other or spaced apart from each other by a predetermined distance. An inlet end 341 and an outlet end 342 of the cold water pipe 34 may extend perpendicularly to the case cover 40. The inlet end 341 of the cold water pipe 34 is connected to a water pipe connected to a water supply source, and the outlet end 342 of the cold water pipe 34 is connected to a water pipe connected to the dispensing port 151 of the water chute 15.

In addition, the partition member 36 is placed on the upper side of the cold water pipe 34 such that the inner space of the cooling water tank 33 is partitioned into a first space in which the evaporator 35 is accommodated and a second space in which the cold water pipe 34 is accommodated. Therefore, the ice formed in the first space cannot move to the second space.

In addition, the evaporator 35 may be wound and seated on the outer circumferential surface of the partition member 36. The evaporator 35 is connected to an outlet end of an expansion valve connected to the outlet end of the condenser 19. The refrigerant flowing along the refrigerant pipe forming the evaporator 35 exchanges heat with the cooling water stored in the cooling water tank 33 to cool the cooling water. The cooling water exchanges heat with the drinking water flowing along the cold water pipe 34 to cool the drinking water to a predetermined temperature.

The cooling water can be frozen on the surface of the evaporator 35 to grow into a lump of ice having a predetermined size. That is, cold air discharged from the evaporator freezes the cooling water, thereby achieving the effect of accumulating the cold air. That is, even when the compressor 18 is not driven, the cooling water in the ice state and the cooling water in the liquid state exchange heat with each other by the agitating operation of the agitator 39 such that the cooling water in the liquid state can be maintained below a reference temperature.

The water purifier according to the embodiment of the present invention may be defined as an ice-storage type water purifier because a part of the cooling water exists on the surface of the evaporator in the form of ice to accumulate cold air.

In addition, the tank cover 37 is provided in the form of covering the upper end of the cooling water tank 33, and covers the upper surface of the first space. That is, the first space is defined between the tank cover 37 and the partition member 36, and the second space is defined between the partition member 36 and the bottom portion of the cooling water tank 33. A cooling water inflow port 371 may be formed at one side of the tank cover 37. The cooling water inflow port 371 is connected to a water pipe connected to a water supply source such that cooling water is supplied to and filled in the cooling water tank 33.

In addition, the agitator 39 may be disposed at an approximately middle portion of the second space, but is not limited thereto. When the agitator 39 rotates, the cooling water in the second space exchanges heat with the ice in the first space, such that the temperature of the cooling water can be uniformly maintained at all positions inside the cooling water tank 33.

The agitator 39 may be formed in a blade or impeller shape extending radially from the rotational shaft as shown, but is not limited thereto. The agitator 39 may be formed in various shapes.

A temperature sensor 41 for measuring the temperature of the cooling water in the first space may be installed at one side of the bottom surface of the tank cover 37. The temperature sensor 41 extends downward from the bottom surface of the tank cover 37 to detect the temperature of the cooling water in the first space. The control unit of the water purifier determines the temperature value of the first space at the cooling water temperature.

Meanwhile, the case cover 40 is fitted into the outer circumferential surface of the upper end of the insulation case 31 to cover the opened upper surface of the insulation case 31 and the cooling water tank 33. A port accommodation hole 401 through which the cooling water inflow port 371 passes and is exposed to the outside may be formed in the case cover 40. A cold water pipe guide groove 402 through which the inlet end 341 and the outlet end 342 of the cold water pipe 34 pass may be formed at the edge of one side of the case cover 40. An evaporation pipe guide hole 403 through which the pipe of the evaporator 35 passes may be formed at the edge of the other side of the case cover 40.

Figure 7:
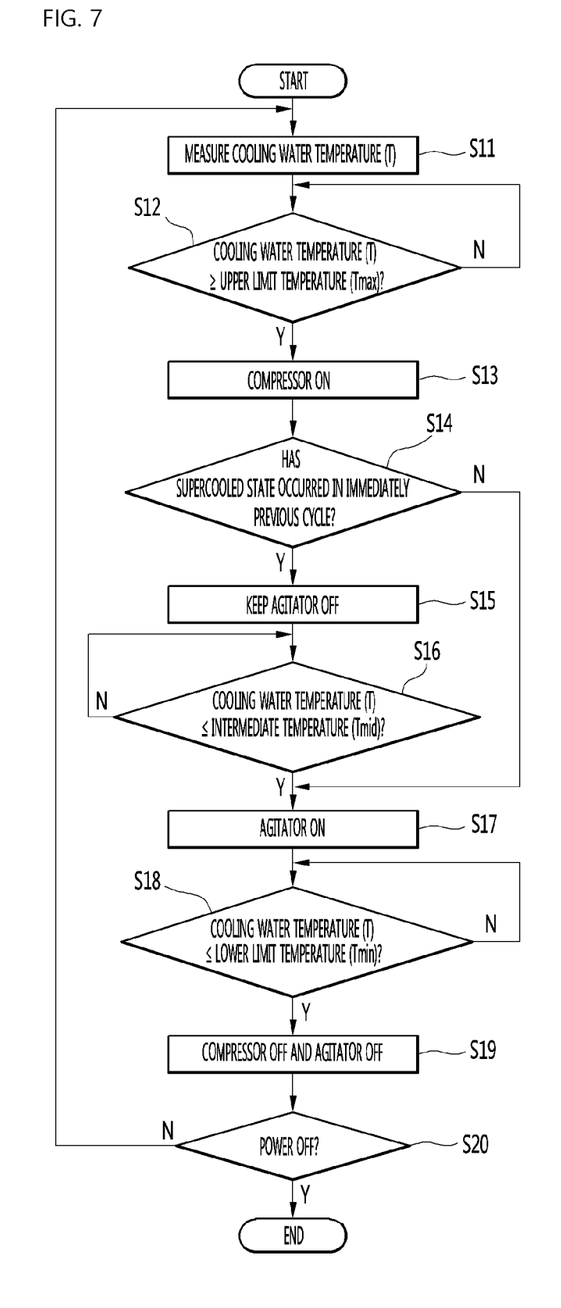
FIG. 7 is a flowchart showing a method for controlling a water purifier according to an embodiment of the present invention.

FIG. 7 is a flowchart showing a method for controlling a water purifier according to an embodiment of the present invention.

Referring to FIG. 7, according to the method for controlling the water purifier according to the embodiment of the present invention, when the cooling cycle (or refrigerating cycle) for cooling the cooling water is started, if a supercooled state occurs in the process of driving a immediately previous cooling cycle, the control for preventing the supercooling during a current cooling cycle is implemented.

In detail, the control method for preventing supercooling according to the present invention is performed at the same time as the power on of the water purifier 10.

When the water purifier 10 is powered on, the temperature sensor 41 detects the temperature of the cooling water (S11), and the detected cooling water temperature is transmitted to the control unit of the water purifier 10. The control unit determines whether the detected cooling water temperature T has reached an upper limit temperature Tmax for driving the cooling cycle (S12). The upper limit temperature may be configured to be 1° C. or 2° C., but is not limited thereto.

When it is determined that the cooling water temperature T has reached the upper limit temperature, the driving of the compressor constituting the cooling cycle is started (S13). In detail, when the compressor is driven, the control unit determines whether a supercooling state has occurred in the immediately previous refrigerating cycle (S14).

Here, the method for determining the supercooled state is to determine whether the temperature change slope deviates from a set range during the unit time in a phase change section. That is, in the normal state, there is no temperature change at the freezing temperature, and the phase change process is performed. Therefore, the temperature change slope is close to zero. However, in the supercooled state, since the cooling water abruptly drops below the freezing temperature without phase change, the temperature change slope becomes smaller than zero. Therefore, when the temperature change slope is out of a certain slope range, it can be regarded as a supercooled state.

In detail, when the supercooling state has occurred, the agitator 39 is driven together with the driving of the compressor to mix the cooling water.

In contrast, when the supercooled state has occurred in the immediately previous cooling cycle operation, only the compressor 18 is driven and the agitator 39 is kept in a stopped state (S15). When the compressor 18 is driven and the time has elapsed after the cooling cycle is operated, the control unit determines whether the cooling water temperature T has reached an intermediate temperature Tmid (S16). The intermediate temperature Tmid may be configured to be 1° C. or 1.5° C., but is not limited thereto.

When the cooling water temperature drops to the intermediate temperature Tmid, the agitator 39 is operated (S17). That is, the compressor is driven and agitator is kept in a stopped state until the cooling water temperature drops from the upper limit temperature to the intermediate temperature, such that freezing nuclei can be rapidly formed on the surface of the evaporator.

When the compressor 18 and the agitator 39 are driven together and the cooling water temperature T reaches the lower limit temperature Tmin (S18), the compressor 18 and the agitator 39 are stopped at the same time (S19). The lower limit temperature Tmin may be configured to be −2° C., but is not limited thereto.

It is determined whether the power of the water purifier is turned off (S20), and while the power is not turned off, the above-described control method is repeatedly performed.

Figure 8:
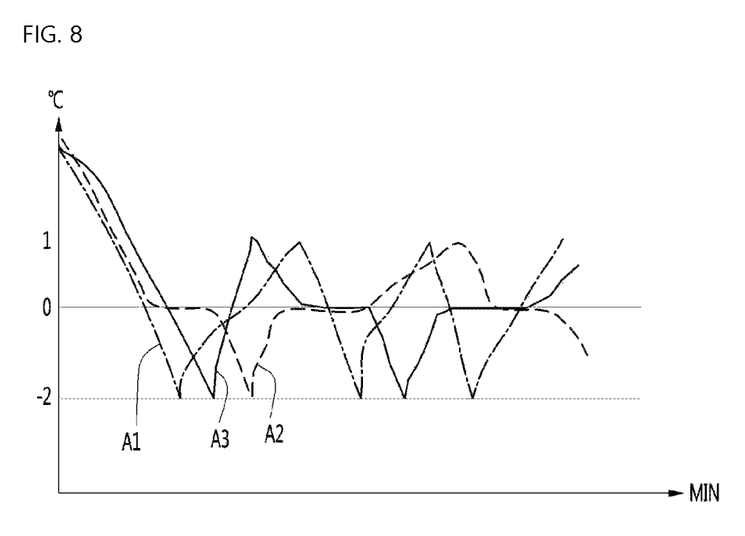
FIG. 8 is a graph showing a temperature distribution of cooling water in a normal in which a supercooled state has not occurred, in an abnormal state in which the supercooled state has occurred, and in a state in which the control method of the present invention is applied.

FIG. 8 is a graph showing a temperature distribution of cooling water in a normal in which a supercooled state has not occurred, in an abnormal state in which the supercooled state has occurred, and in a state in which the control method of the present invention is applied.

Referring to FIG. 8, A1 is a graph of a temperature distribution of cooling water in an abnormal state in which a supercooled state has occurred, A2 is a graph of a temperature distribution of cooling water in a normal state in which a supercooled state has not occurred, and A3 is a graph of a temperature distribution of cooling water in a state in which a supercooled state has occurred and the control method according to the embodiment of the present invention is implemented.

First, referring to the graph A2 in the normal state, when the refrigerating cycle is driven when the cooling water temperature is the upper limit temperature or higher (immediately after the product is installed), the temperature gradually decreases. When the cooling water temperature reaches the freezing temperature (0° C.), it undergoes a phase change from a liquid to a solid.

The volume of the ice formed on the surface of the evaporator may increase, such that the ice can contact the temperature sensor 41. When the cooling cycle is continuously driven in this state, the cooling water temperature drops to the lower limit temperature. The lower limit temperature may be configured to be 2° C., but is not limited thereto.

When the cooling water temperature reaches the lower limit temperature, the compressor stops driving and the heat exchange between the evaporator and the cooling water is stopped. The drinking water is continuously dispensed to cause heat exchange between the cold water pipe and the cooling water, or the cooling water temperature gradually increases through heat loss of the cooling water tank itself. Then, when the cooling water temperature reaches 0° C., a phase change process is performed from a solid to a liquid, and the ice that has been in contact with the temperature sensor is melted and changed to a liquid. Therefore, the temperature of the cooling water may rise to above zero. When the cooling water temperature detected by temperature sensor reaches the upper limit temperature, the refrigerating cycle is driven again, and the process of decreasing the temperature of the cooling water is repeated.

However, referring to the graph A1 in which the supercooled state has occurred, when the refrigerating cycle is driven at the upper limit temperature or higher, the cooling water temperature gradually decreases. The phase change does not occur even when the cooling water temperature reaches the freezing temperature, and the cooling water temperature suddenly drops to the lower limit temperature. When the cooling water temperature drops to the lower limit temperature, the refrigerating cycle is stopped and the cooling water temperature rises to the upper limit temperature again. Thus, when the supercooled state occurs, the cooling water temperature graph shows a zigzag shape that reciprocates between the upper limit temperature and the lower limit temperature. The slope value of the temperature change in the freezing temperature range in which the phase change should occur is significantly smaller than zero.

Referring to the graph A3 to which the control method according to the embodiment of the present invention is applied, the refrigerating cycle is driven at the upper limit temperature or higher, and the cooling water temperature gradually decreases. When the supercooled state in which the cooling water drops to the lower limit temperature without undergoing the phase change process in the freezing temperature range occurs, the refrigerating cycle is driven until the cooling water temperature reaches the lower limit temperature. A separate supercooling prevention algorithm is not implemented in the period in which the supercooled state occurs in the refrigerating cycle driving cycle.

However, when the refrigerating cycle period in which the supercooled state occurs is ended and the refrigerating cycle is newly driven while the cooling water temperature rises to the upper limit temperature, it is determined whether the supercooled state has occurred in the immediately previous cycle. When it is determined that the supercooled state has occurred, the supercooling prevention algorithm is performed.

That is, when it is determined that the supercooled state has occurred immediately before, the agitator is kept in a stopped state until the cooling water temperature drops to the intermediate temperature Tmid when the compressor is newly driven. The intermediate temperature Tmid is lower than the phase change temperature, and the agitator is operated to break the previous stabilized state while the cooling water is lowered to a temperature lower than the phase change temperature.

Then, even when the supercooled state in which the phase change does not occur until the cooling water is lowered to the intermediate temperature, the agitator is operated to break the stabilized state. Therefore, ice will be formed from that moment.

If freezing occurs at the phase change temperature, ice is grown regardless of the operation of the agitator. When the supercooled state has occurred, icing starts from the operating point of the agitator. Therefore, the process of checking whether the supercooling has occurred is not separately required.

In addition, in order to break the stabilized state, a separate structure such as an ultrasonic wave is not required, and an original agitator can be used.

Meanwhile, when the agitator starts to form ice, a normal-state temperature change curve is drawn.

The reason why the agitator is not operated at an early stage of the refrigerating cycle so as to prevent the supercooled state from occurring is because the freezing nuclei generated at the freezing temperature does not stick to the surface of the evaporator due to the cooling water flow caused by the operation of the agitator.

As a result of repeating the experiment to delay the operating time of the agitator at an early stage of the refrigerating cycle operation performed after the occurrence of the supercooling, it was confirmed that the supercooling no longer occurs and ice is normally formed.

The invention claimed is:

1. A method for controlling a water purifier, the water purifier including: a cooling water tank configured to store cooling water; a cold water pipe disposed in the cooling water tank and configured to carry edible water to allow the edible water to exchange heat with the cooling water such that the edible water is cooled to a temperature lower than room temperature; an evaporator accommodated in the cooling water tank and configured to carry a low-temperature, low-pressure two-phase refrigerant for cooling the cooling water; a compressor configured to compress the low-temperature, low-pressure two-phase refrigerant introduced from the evaporator into a high-temperature, high-pressure gaseous refrigerant; and an agitator accommodated in the cooling water tank and configured to cause the cooling water to flow in the cooling water tank such that the cooling water in a liquid state exchanges heat with the cooling water in an ice state generated on a surface of the evaporator, the method comprising:

driving the compressor based on a temperature of the cooling water rising to an upper limit temperature; and based on determining that a super-cooled state has occurred to the cooling water in the cooling water tank while the compressor is driven, delaying a driving of the agitator.

2. The method according to claim 1, wherein delaying the driving of the agitator comprises:

delaying the driving of the agitator until the temperature of the cooling water drops to an intermediate temperature that is lower than the upper limit temperature.

3. The method according to claim 2, wherein the intermediate temperature is lower than a freezing temperature of the cooling water in a state different from the super-cooled state.

4. The method according to claim 2, wherein the intermediate temperature is lower than 0° C.

5. The method according to claim 2, wherein the intermediate temperature is 1° C.

6. The method according to claim 2, further comprising:

based on the temperature of the cooling water reaching a lower limit temperature, stopping the compressor and the agitator.

7. The method according to claim 6, wherein the lower limit temperature is lower than the intermediate temperature.

8. The method according to claim 6, wherein the lower limit temperature is −2° C.

9. The method according to claim 1, further comprising:

based on a determination that the super-cooled state has not occurred to the cooling water in the cooling water tank while the compressor is driven, driving the agitator while the compressor is driven.

10. The method according to claim 1, wherein delaying the driving of the agitator comprises maintaining the agitator as tuned off while driving the compressor.

11. The method according to claim 1, further comprising:
   determining whether the temperature of the cooling water drops to an intermediate temperature that is lower than the upper limit temperature; and
   starting the driving of the agitator based on a determination that the temperature of the cooling water has dropped to the intermediate temperature.

12. The method according to claim 1, further comprising:
   determining whether the super-cooled state has occurred based on the temperature of the cooling water during the driving of the compressor.

13. The method according to claim 1, further comprising:
   determining whether the super-cooled state has occurred based on a slope of the temperature of the cooling water over time during the driving of the compressor.

* * * * *